Dec. 11, 1962  P. A. REDHEAD  3,068,402
DESORPTION SPECTROMETERS
Filed Sept. 21, 1960  3 Sheets-Sheet 1

INVENTOR
PAUL AVELING REDHEAD
R. J. Filipkowski
PATENT AGENT

Dec. 11, 1962 P. A. REDHEAD 3,068,402
DESORPTION SPECTROMETERS
Filed Sept. 21, 1960 3 Sheets-Sheet 2
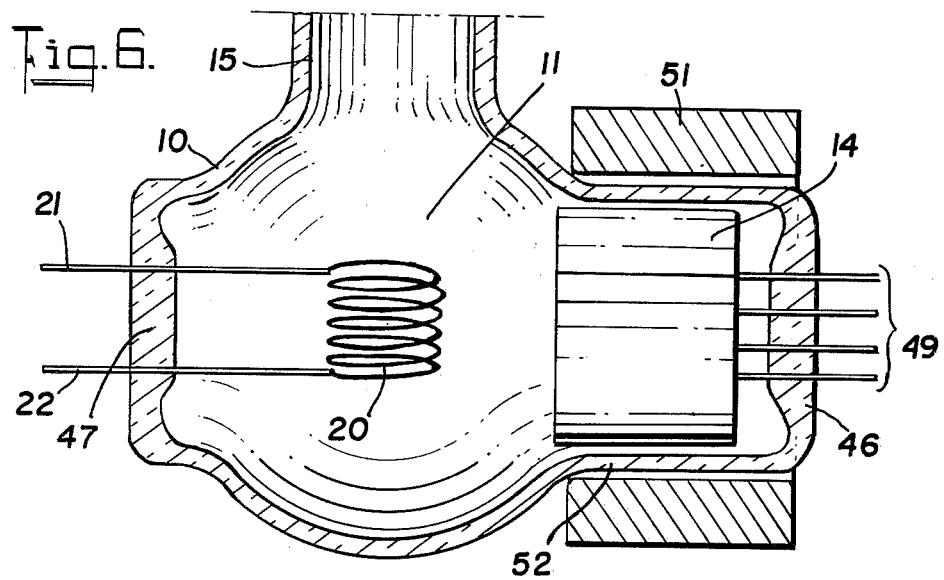
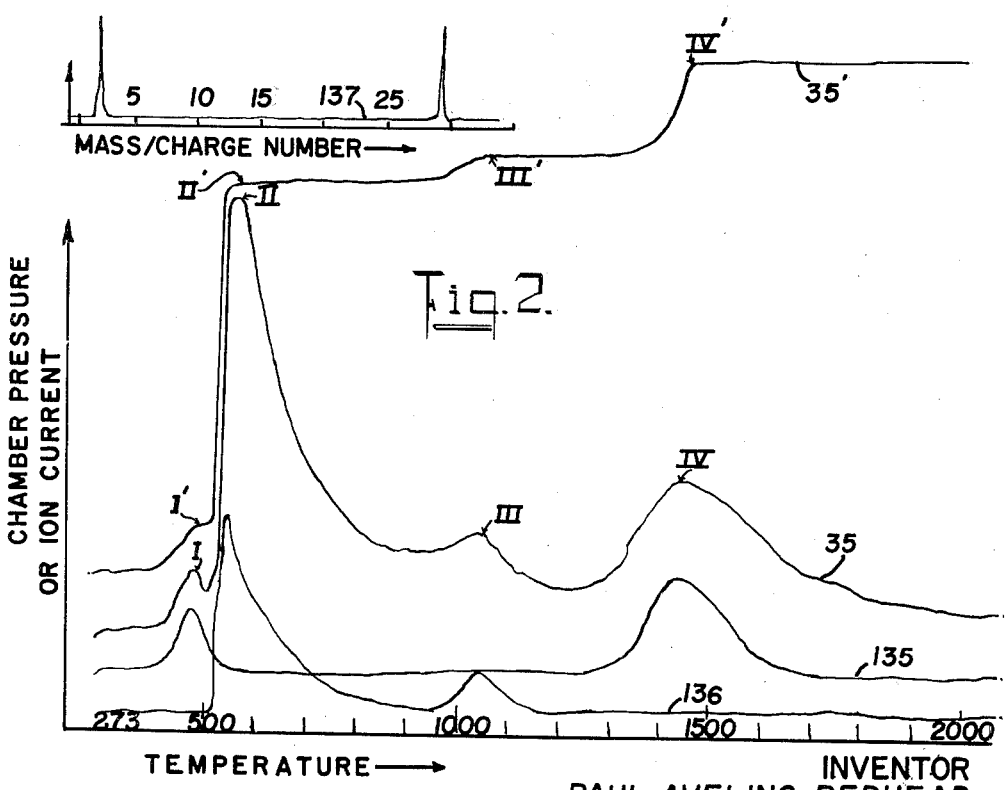
INVENTOR
PAUL AVELING REDHEAD Dec. 11, 1962 P. A. REDHEAD 3,068,402
DESORPTION SPECTROMETERS
Filed Sept. 21, 1960 3 Sheets-Sheet 3
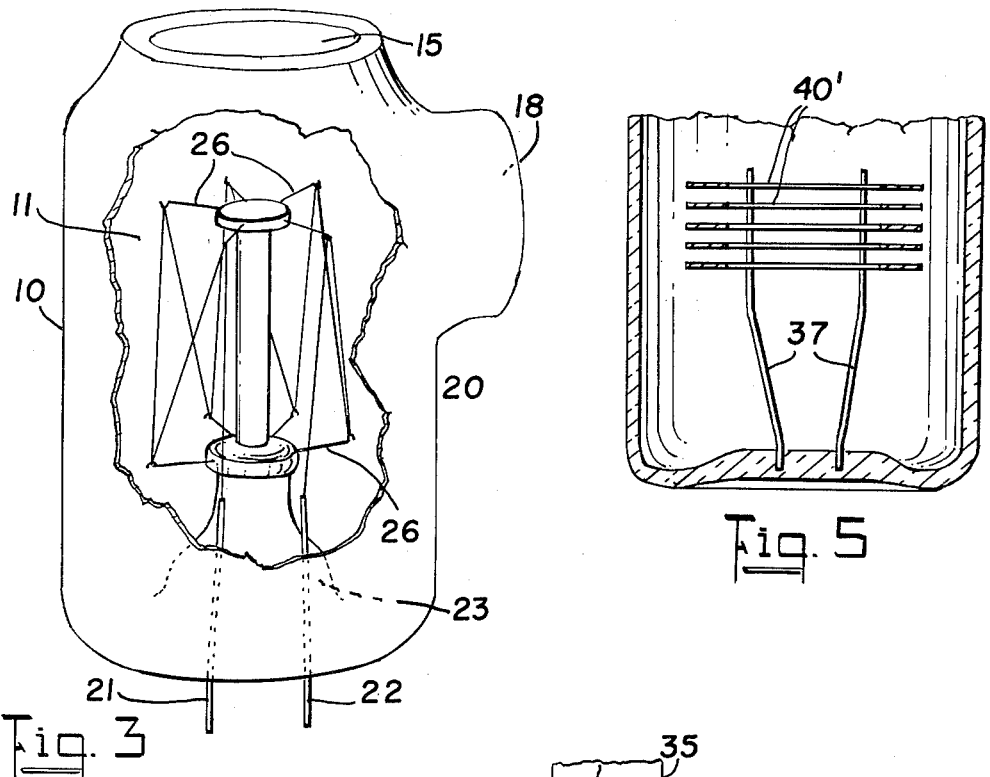
Fig. 3
Fig. 5
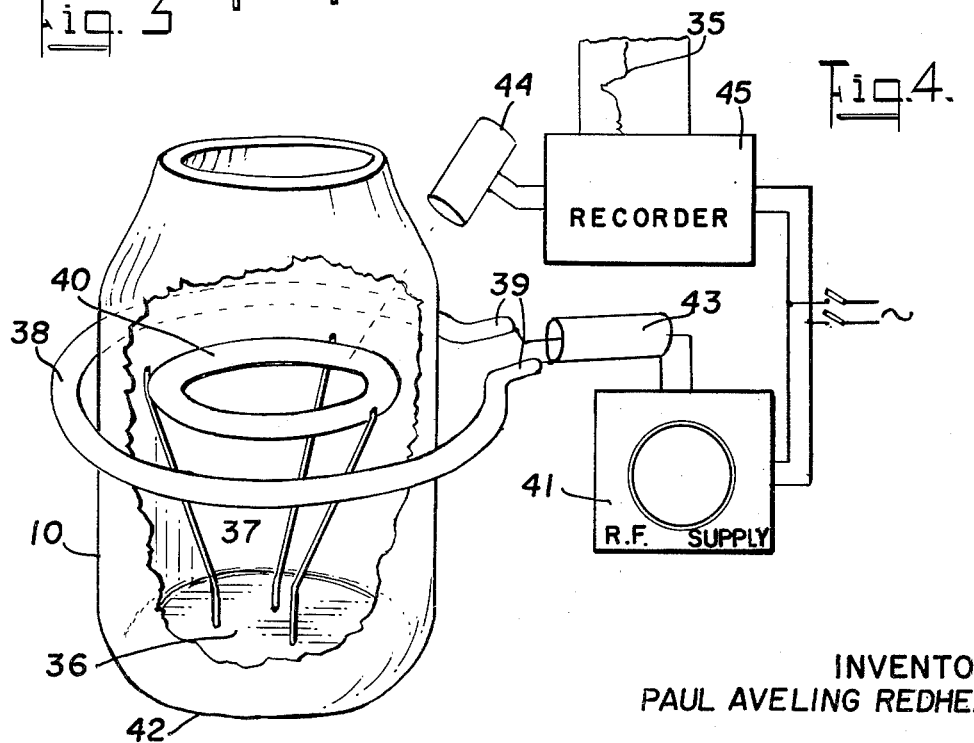
Fig. 4
INVENTOR
PAUL AVELING REDHEAD
R.J. Filipkowski
PATENT AGENT 3,068,402
DESORPTION SPECTROMETERS
Paul Aveling Redhead, Ottawa, Ontario, Canada, assignor to National Research Council, Ottawa, Ontario, Canada, a body corporate of Canada
Filed Sept. 21, 1960, Ser. No. 57,533
17 Claims. (Cl. 324—33)

The invention hereinafter described concerns improvements in instruments for analysing gases and specifically relates to desorption spectrometer apparatus which detects gases selectively desorbed from the surface of a solid substance as its temperature is raised.

Heretofore the analysis by means of a mass spectrometer of rarefied gas samples has been limited practically to pressures above about $10^{-9}$ mm. Hg. Identification of gas constituents at lower pressures requires apparatus of greatly increased complexity and considerably longer procedures attended by difficulties of amplifying very weak currents.

Analysis of the gas constituents of an extremely rarefied gas sample may be carried out relatively simply and economically by the method and apparatus according to the present invention, which depends on the fact that substantial variations of pressure may be produced in an evacuated space as a result of the evolution of adsorbed gases from a solid body at characteristic desorption temperatures. It has been found that when a solid substance such as a metal strip or filament, upon whose surface constituents of the sample have been adsorbed at a sufficiently low temperature, is heated gradually at a controlled rate to a higher temperature the phenomenon of selective desorption of the constituents within specific ranges of temperature occurs. Identification of constituents of the sample can be made by correlating gas pressure variations with temperature of the substance.

The present invention therefore seeks to provide a novel and simple method and apparatus for the analysis of a gaseous mixture at low pressure by the measurement and recording of the variations in gas pressure produced in a vacuum system by release of adsorbed gases from a solid substance as its temperature is gradually raised from the cold state, while pumping is continued to tend to maintain the system pressure at a stable value.

In carrying the invention into effect a chamber is provided for containing a sample of rarefied gas or gas mixture, connected to a vacuum pump and an ionization gauge or mass spectrometer arranged to measure very low total gas pressure or partial gas pressure continuously and connected with recording apparatus, and a solid adsorber body which may be a metal conductor is located within the chamber and is arranged to have its temperature raised at a controlled rate from an initial low temperature. The mixture of gases including reaction products which have been adsorbed upon the previously cleaned surfaces of the adsorber body while cold are separately desorbed therefrom at characteristic temperatures to produce temporary increases of pressure or partial pressure in the chamber, the released gas being pumped away by the action of the ionization gauge and any auxiliary pump that may be connected with the chamber. The gases producing the peaks in the resulting record may be identified by a calibration record of gas evolution versus adsorbed body temperature, as may be obtained by introducing known gases into a previously cleaned system, as well as by means of a mass spectrometer.

The adsorber substance is preferably realized as a refractory metal body such as tungsten having the form of a filament, strip, plate, or disc, arranged to be supplied by a heating current at a rate such that a predetermined variation of temperature with time is obtained during the desorption cycle. The variation may preferably be linear but may also be according to a non-linear function of time. The initially adsorbed layers of gaseous matter are removed by repeated flashing at about 2300° K. while pumping is continued to a suitably low chamber pressure, the filament then being allowed to cool and remain cold for a measured time while exposed to the rarefied sample introduced into the chamber. The desorption step is next carried out, by increasing the filament temperature at a rate of about 30° C. to 50° C. per second, with the total or partial pressure gauge, recording apparatus, and auxiliary pump all operating. The peaks of total or partial pressure recorded on the resulting chart constitute a "spectrum" enabling identification to be made of constituents in the sample.

A preferred form of combined pump and ionization gauge for use at ultra-high vacuum is the inverted magnetron form of cold cathode ionization gauge as described and claimed in my Patent No. 2,937,295. Such device is effective both as a pump and as a total pressure measuring instrument wherein an ion current is derived proportional to pressure down to the lowest limits of measurement technique, operating in the range of pressures between about $10^{-4}$ mm. Hg and about $10^{-14}$ mm. Hg, and responding rapidly to pressure variations. Various other high vacuum gauges may also be employed provided these have sufficient accuracy at very low pressures of samples.

Alternatively or in conjunction with the total pressure indicating forms of ionization gauges referred to, a partial pressure sensitive ionization device, namely, a mass-spectrometer may be employed. A preferred device of this case is the omegatron such as that described in the co-pending application of L. McNarry and P. Hobson, Serial No. 657,616, entitled "Omegatron With Orbit Increment Detection" capable of resolution of ions at high mass numbers. Throughout this specification such device will be included by the term "ionization vacuum gauge" which is intended to include devices wherein an ion current is produced proportional either to total pressure of a gas mixture or to the partial pressure of a selected constituent of the mixture.

The adsorbing solid substance may initially be held at room temperature or at any lower or higher temperature as desired, the rare gases requiring extremely low temperatures of the adsorbing substance to exhibit the desorption phenomenon satisfactorily while active gases desorb generally above room temperature.

The principles and practice of the invention may be understood more fully from a reading of the following description of its embodiments and their use, in conjunction with the figures of accompanying drawings, wherein:

FIG. 2 is a graph showing a spectrum of pressure variations obtained by apparatus according to the invention with respect to temperature or mass/charge ratio;

FIG. 3 is a perspective cutaway illustration of an analysis chamber enclosing a filamentary desorber body;

FIG. 4 shows an annular disc adsorber body in an alternative form of desorption spectrometer employing induction heating for varying desorber body temperature;

FIG. 5 shows an assembly of annular disc desorber bodies similar to FIG. 4, arranged for induction heating; and FIG. 6 illustrates a desorber filament and an ionization gauge adjacently disposed in an alternative spectrometer form.

Figure 1:
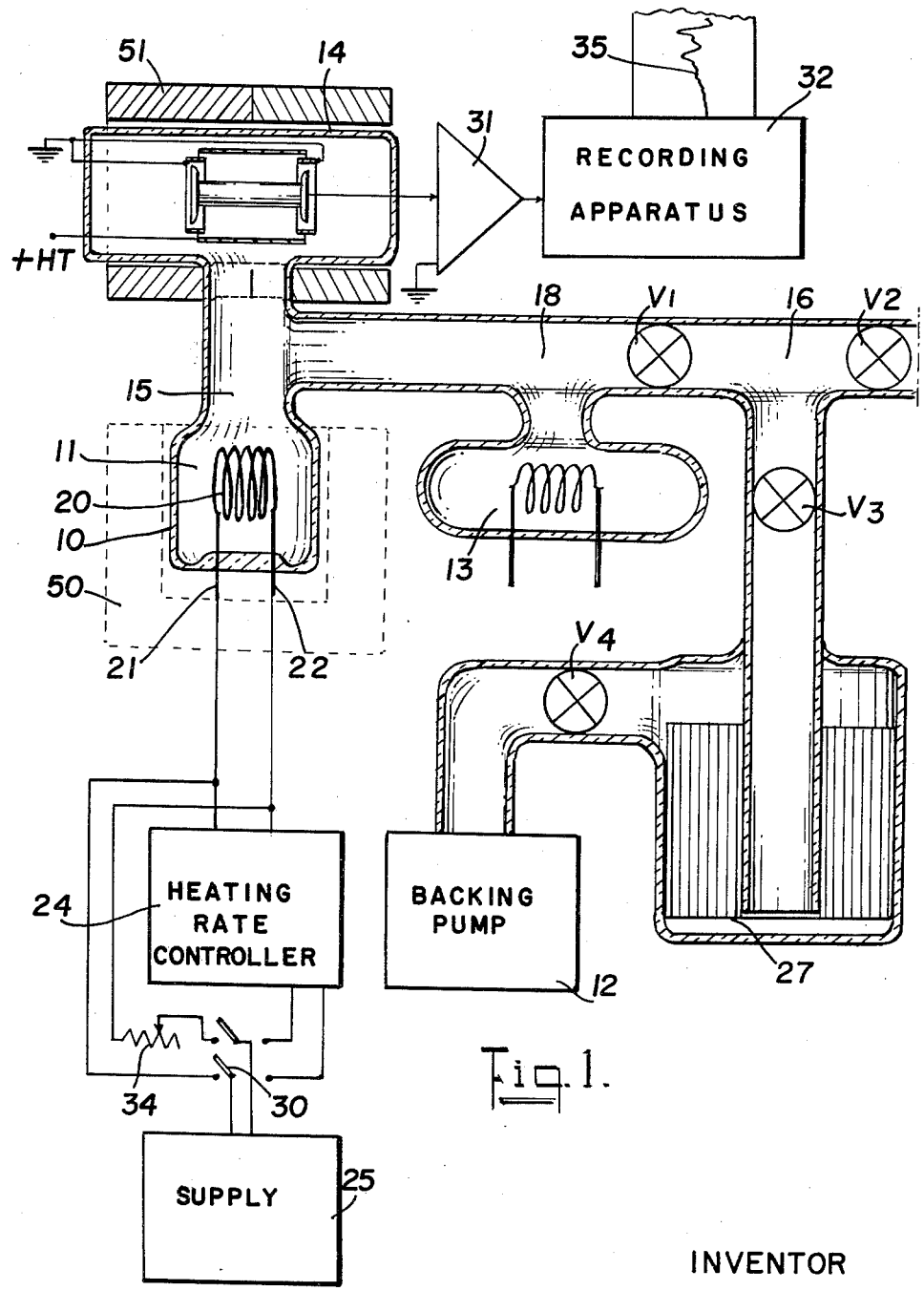
FIG. 1 is a schematic diagram of a desorption spectrometer system according to the invention.

Referring to the drawing, a desorption spectrometer consists of an envelope 10 surrounding a chamber or vessel space 11 wherein an adsorber body 20 of extended surface area is mounted. A neck 15 extending from the chamber is connected with a low vacuum fore-pump 12 by valves V1 and V3, and is permanently connected with a high vacuum gettering pump 13 and an ionization vacuum gauge 14. A side tube 16 is connected with a source (not shown) of a sample of a gas or a gas mixture to be identified as to its constituents, and is also connected with a lateral arm entering the vacuum line 18 between valves V1 and V3 by means of valve V2. The chamber is preferably cylindriform to facilitate immersion in a Dewar flask 50, the latter being removable and shown in dotted outline in enclosing relation.

The desorber body 20 preferably has the form of a refractory metal wire of small diameter and of any convenient length, and is arranged either to be self-supporting as a helical coil held by its ends, or to be mounted as a number of spans of fine wire looped as in FIG. 3 in zig-zag arrangement between suspension hooks such as 26 in the manner in which fragile lamp filaments are commonly supported. In a preferred embodiment the ends of the filamentary body 20 are supported on stiff wire leads 21 and 22 of the same metal, sealed into an end 23 of the envelope 10.

The character of the metal surface is preferably non-porous, i.e., the surface layers should be free of micropores, and any openings should have transverse dimensions which are a relatively large multiple of the diameter of a molecule of gas to which the adsorber body will be exposed. Surface smoothness is not a necessary characteristic, however, and the filament surface may be corrugated or otherwise formed to increase its area. Highly purified metals are essential for the highest accuracy of desorption analysis, the "carbon-free" form of tungsten being the preferred form of that metal.

Heating current is provided to the leads 21 and 22 either at a constant value directly through switch 30 and rheostat 34 from a supply 25, or through a variable rate control system 24, the latter being arranged to effect a predetermined rate of heating throughout a heating cycle. For example, the control system may be arranged to raise the filament temperature in a typical cycle from about 293° K. to about 2100° K. at a mean rate of 35 degrees per second.

The initial out-gassing of the system may be performed by closing V2 and opening V1, V3, and V4 to connect pump 12 with the system to exhaust it to backing pressure through a metal labyrinth trap 27. The vacuum system is heated for several hours as by radiant heat-sources while pumping is continued. After out-gassing V3 are closed, after which the gettering pump 13 is put into operation. The latter device may comprise a known form of titanium vapour vacuum pump, which is run until the pressure as indicated by ion current recorder 32 fed from amplifier 31 is below $10^{-10}$ mm. Hg. The filament is initially cleaned by heating to 2300° K., as by connecting supply 25 thereto through switch 30 for a number of minutes or even hours. A number of short "flashes" of additional heating current should be applied, for example having durations of one second spaced ten seconds, wherein the filament temperature reaches about 2400° K. Such flashing may be arranged to be effected automatically or by manual means, according to known techniques. The filament is clean when the pressure peaks produced with each flash reach a constant amplitude.

When the filament 20 has cooled to a suitably low temperature, which may be the ambient room temperature or a lower temperature produced by refrigeration of the envelope 10, a sample of gas to be analysed is admitted to chamber 16 by opening V2. The valve V1 is then adjusted either to fill spaces 11, 15, and 18 at a relatively high pressure, and then closed, or to admit a continuous flow of the gas at a rate correlated with the pumping speed of device 14 so that the pressure in chamber 11 does not exceed about $10^{-7}$ mm. Hg.

After a predetermined adsorption interval has elapsed, depending in part on the nature of gases contained in the sample, the gas pressure, and the cold temperature of the adsorber filamentary body 20, the surfaces of the latter will have become covered by a molecular layer or layers of the gases. In the system where the sample was admitted at relatively high pressure pump 13 is operated to reduce the pressure in space 11 to $10^{-7}$ mm. Hg or less before heating the filament.

The temperature of filament 20 is raised gradually according to a predetermined time function. When the duration of the desorption cycle is made to be of the order of one minute with a linear temperature rise, the response time of gauge 14 as well as that of the connected amplifier and recorder devices 31 and 32 requires to be short, for example, 0.25 second or less, in order to resolve the peaks of total or partial pressure produced by selective evolution of adsorbed gases. A typical "spectrum" obtained with such heating cycle for a tungsten filament is shown in FIG. 2, the record trace 35 relating chamber pressure versus temperature of filament 20 rising and descending in a number of peaks labelled I, II, III, and IV, above the initial cold system pressure.

The four peaks recorded are interpretable as indicating the presence of constituent gases hydrogen and carbon monoxide, each producing a pair of separate pressure peaks upon desorption of a low temperature adsorbed phase and of a high temperature adsorbed phase. Peak I is produced by release of the low temperature phase of carbon monoxide; peaks II and III are respectively due to the release of the low and high temperature phases of hydrogen; and peak IV is due to the high temperature phase of carbon monoxide. Many of the simple gases have been found to adsorb on a tungsten surface in two phases, i.e., their desorption occurs selectively when the tungsten body temperature rises through either of two narrow ranges of temperature.

The fall of the peak pressure which occurs when a desorption temperature interval of a phase of one of the constituent gases of the sample has been passed through as the desorber body temperature rises is determined in part by the pumping speed of the system, and in part by the vacuum conductance of tubes 15 and 18. For sharp resolution of the peaks of a "spectrum" of gases the pumping speed should be high. Useful records may however be obtained with systems employing pumps of relatively low speed, or even with no connected means of removing desorbed gas molecules otherwise than by the action of a gauge 14. The nature of the record trace 35' which is produced in such circumstances is a generally ascending line comprising rising portions I', II', III' and IV', followed by plateau portions. Such trace may be mechanically differentiated to yield a trace similar to that shown by 35, with some loss in resolution particularly as the total chamber pressure increases greatly as desorption proceeds.

Where the sample is a very large rarefied volume as in outer space, the direct connection of chamber space 11 through a minimum of ducting realizes an effectively high pumping speed, whereby the amplitude of total pressure peaks recorded becomes smaller, but the resolution sharper. For each situation a rate of pumping can be chosen to produce the optimum relation between amplitude of variations and sharpness of resolution.

The combination in a vacuum system of an ionization gauge 14 in the form of a mass-spectrometer together with a body 20 capable of adsorbing and desorbing gaseous constituents afford special advantages. The high resolving power and absolute identification characteristics of the mass spectrometer, together with the ability of the desorber body to collect a film from a system atmosphere even when rarefied to the highest degree and to evolve constituents thereafter at higher system pressure, makes possible determination of a sample at the lowest pressures. The body 20 serves as an integrator which accumulates a deposit of a sample throughout an adsorption interval which may be made as long as desired, and which releases each constituent selectively at a relatively rapid rate during the desorption cycle.

Two methods of gas determination by desorption spectrometer apparatus may be employed. In a first method, the mass-spectrometer is initially adjusted to select ions of a first mass number, and the desorption cycle is carried out while a trace such as 135 is produced. With the mass-spectrometer adjusted to detect ions of a second mass number the desorption cycle is repeated, and a second trace 136 produced. The desorption cycle is repeated as often as desired, with the mass-spectrometer adjusted prior to each cycle to detect ions of a different mass number. All phases of a gas are shown by the record thereby obtained, as indicated by the two traces 135, 136.

In a second method of gas determination the desorption cycle is rapidly completed to evolve all gas phases in a short time, after which a rapid sweep is made through a range of mass/charge ratios of interest by the mass-spectrometer, to produce a single trace 137. By these methods very low partial pressures of gases in a sample may be raised by a large factor to increase greatly the sensitivity of the mass spectrometer.

A group of metals other than tungsten which may be employed as adsorber/desorber substances includes molybdenum, platinum, rhenium, osmium, iridium, vanadium, or any suitably refractory metal or alloy whose melting point exceeds about 2,000° K., so that the desorber body, whether filament, strip, or disc, remain structurally coherent at the upper temperature limits reached in the desorption or cleaning steps.

While resistance heating by directly connecting a supply of electric current to flow through the adsorber is a preferred means of elevating its temperature, heating by means of induced currents, as in an electric time-varying field may also be employed. Referring now to FIGURE 4, a portion of an analysis chamber 11 is shown within an envelope 10 supporting a press 36 sealed into the closed lower end 42 thereof. Press 36 in turn supports a plurality of slender refractory support bodies which may be tungsten wires, whose upper ends are spaced uniformly apart and connected to the margin of an annulus 40 made of tungsten. An induction heating coil 38, illustrated as a single turn of tubing held in the same plane as annulus 40, is arranged to be fed from a source 41 of radio frequency heating current by transmission line 43 connected to ends 39 of the coil. The temperature of the annulus is monitored by a temperature sensing element 44 feeding its output signal to a recorder 45, which is arranged to have its record trace correlated with a trace produced by recording device 32, as for instance by running at related speeds.

As heating current is induced in the ring 40 its temperature rises, being substantially uniform over its entire surface area, and is recorded during the desorption cycle on apparatus 45. The ring may be formed of homogeneous metal or it may consist of a suitable base of a refractory metal or ceramic upon whose surface a completely enclosing thin shell of conductive metal is deposited, as by electroplating or ionic sputtering.

The total surface area of a desorber body may be made as small or as large as desired, and as shown in FIG. 5 a relatively large total area may be effected by stacking a plurality of similar annuli 40' coaxially mounted and axially spaced apart. The stack is arranged to lie substantially centered in the same plane as coil 38 of FIG. 4, to achieve uniform heating.

The desorption spectrometer illustrated in FIG. 6 provides a common envelope 10 of bulbous form having a neck 15 of relatively large diameter opening and a cylindrical side extension 52 for receiving an ionization gauge 14 therein. The closed end of the extension is formed as a press 46 through which mounting leads for the electrodes of the gauge pass, these being indicated as group 49. A further press 47 holds lead-in wires 21 and 22 for the support and electrical energization of a desorber helix 20 in space 11. A permanent magnet 51 of annular cylindrical form is adapted to slide closely over the extension 52 to provide a unidirectional magnetic field across the inter-electrode space in gauge 14, the latter being of any suitable type and including omegatron and other mass spectrometer devices.

By the close positional relation provided between the desorber body 20 and the gauge 14, very high values of vacuum conductance are realized, so that pressure variations in space 11 tend to be more sharply defined by the ion current indications of gauge 14. The opening of neck 15 may be connected with a vacuum system and any suitable means to admit a rarefied sample. A desorption spectrometer of such form has the advantage that the filament 20 may be cleaned by positive ion bombardment, by connecting the filament with the negative terminal of a source of high voltage supply (not shown) and one or more of the electrodes of gauge 14 with the positive terminal, to set up a space discharge across the anode-cathode space so formed. The same high voltage supply as is used to operate gauge 14 may be used for this purpose.

Desorption spectrometers of the type described have utility for the analysis of partial pressures of the simple active gases such as hydrogen, carbon monoxide, nitrogen, and oxygen, in addition to the inactive gases, at pressures below about $10^{-7}$ mm. Hg. The sensitivity of the device has been demonstrated by the detection of gases such as hydrogen and carbon monoxide at a partial pressure of the order of $10^{-14}$ mm. Hg with an adsorption period of the order of two minutes, while at higher partial pressures the adsorption period requires to be much less, for example only a few seconds at $10^{-7}$ mm. Hg.

It is to be understood that automatic cycling of apparatus according to the invention may be arranged, the desorption spectrometer apparatus periodically having its adsorbing body heated from a cold temperature to a high temperature at which a film is entirely removed, followed by a period of cooling of any length during which a new film is deposited.

I claim:
1. The method of determining the constituents of a gaseous substance which comprises the steps of containing a rarefied sample of the substance in a chamber, exposing an adsorbing solid body within the chamber to produce an adsorbed film of said constituents on the surface of said body, and selectively evolving the constituents of the film by gradually raising the body temperature while measuring gas pressure within said chamber as a function of body temperature.

2. The method of determining a constituent of a gaseous substance which comprises the steps of containing a rarefied sample of the substance in a chamber, exposing an adsorbing solid body within the chamber to produce an adsorbed film of said substance on the surface of said body, and selectively evolving constituents of the film by raising the body temperature while measuring the partial pressure of said constituent within said chamber as a function of body temperature.

3. The method of producing a record for the determination of constituents in a rarefied gaseous substance which comprises the steps of containing the substance in a chamber, contacting the surface of a cleaned solid adsorbing body with said substance until an adsorbed film consisting of gaseous constituents is produced on said body, selectively releasing gaseous constituents from said film by increasing the body temperature at a controlled rate, measuring variations in chamber pressure, and recording said variations as a function of increasing body temperature.

4. The method of determining the constituent gases of a rarefied gaseous substance which comprises filling an evacuated chamber with said substance, exposing a cleaned adsorbing metal body to said substance in said chamber for a time and at a pressure sufficient to develop an adsorbed film including constituent gases on said body, removing a portion of said gaseous substance from said chamber to lower the chamber pressure below about $10^{-7}$ mm. Hg, raising the body temperature at a controlled rate through a range of temperature sufficient to ensure evolution of said adsorbed constituents, measuring gas pressure in said chamber continuously while said constituents are being evolved, and recording pressure as a function of body temperature.

5. The method of determining a constituent gas in a rarefied gaseous substance which comprises filling an evacuated chamber with said substance, exposing a cleaned adsorbing metal body to said substance in said chamber for a time and at a pressure sufficient to develop an adsorbed film including said constituent gas on said body, removing a portion of said gaseous substance from said chamber to lower the chamber pressure below about $10^{-7}$ mm. Hg, raising the body temperature at a controlled rate through a range of temperature sufficient to ensure evolution of said adsorbed constituent, measuring the partial pressure of said constituent gas in said chamber continuously while said body temperature is being raised, and recording said partial pressure as a function of body temperature.

6. The method of claim 1 including the step of continuously removing a portion of said rarefied sample and of said evolved constituents from said chamber.

7. The method of claim 2 including the step of continuously removing a portion of said rarefied sample and of said evolved constituents from said chamber.

8. Apparatus for repetitively measuring the partial pressures of constituents of a gaseous substance, comprising an envelope for containing a sample of gaseous substance, a solid body disposed in said envelope capable of storing gaseous substance as an adsorbed film when said body is cooled below a predetermined temperature, means to admit gaseous substance to said envelope, means for continuously removing a fraction of said sample, means for varying the temperature of said solid body as a predetermined function of time whereby to evolve constituents from said body surface at their respective desorption temperatures as said body is heated and whereby to cause said film to be developed when said body is cooled below said predetermined temperature, and means to record variations of gas pressure in said envelope with respect to body temperature.

9. Apparatus for the identification of constituents of a gaseous substance comprising an envelope for receiving a sample of said substance, an opening in said envelope for connection with a source of said substance in rarefied form, an adsorbing solid body and an ionization gauge mounted in adjacent spaced relation within said envelope, means to vary the temperature of said body as a function of time, and means to record variations of pressure in said envelope as measured by said gauge as a function of body temperature.

10. Apparatus for the identification of constituents of a gas comprising an envelope for receiving a sample of said substance, an opening in said envelope for connection with a source of rarefied gas, a solid substantially non-porous body capable of adsorbing a film composed of said constituents on its surface when said body is below a predetermined temperature and of selectively desorbing said constituents when said body temperature is raised sufficiently, an ionization vacuum gauge mounted within said envelope in adjacent spaced relation to said body, means for varying the temperature of said body as a function of time for alternately adsorbing and desorbing constituents, and means for recording variations of gas pressure in said envelope simultaneously with change of body temperature.

11. Apparatus for the identification of constituents of a gaseous substance, comprising an envelope for containing a sample of said substance, an opening in said envelope for connection with a source of said substance, an ionization gauge mounted in said envelope for measuring gas pressure and for continuously decreasing chamber pressure by pumping gas therefrom, an adsorber solid body mounted in said envelope adjacent said gauge, said body having the property of adsorbing a film of said constitutents on its surface at temperatures below a predetermined temperature and of selectively evolving constituents from its surface as its temperature is raised, means for varying the temperature of said body as a function of time through a range extending from a lower temperature lying below said predetermined temperature to a higher temperature at which said film is no longer retained and then cooling said body to said lower temperature, means to record variations of gas pressure, and means to correlate chamber pressure with body temperature.

12. Apparatus as claimed in claim 11 wherein the distance between said body and said gauge is less than the distance between said opening and either one of said gauge and said body.

13. Apparatus as claimed in claim 11 wherein said adsorber body comprises a metal conductor selected from the group of metals consisting of tungsten, platinum, molybdenum, rhenium, iridium, osmium, and vanadium.

14. Apparatus for detecting constituents of a mixture of gases comprising an envelope for containing the mixture, means to fill said envelope with a sample of the mixture, a vacuum gauge mounted in the envelope having an output current related to gas pressure and effective to decrease gas pressure by pumping, means to record said current as a function of time, and means to increase the pressure in said envelope by selectively increasing the partial pressures of constituent gases, said means comprising an adsorbing solid body having the property of storing a film consisting of said constituents upon its surface at a predetermined lower temperature and of desorbing said constituents selectively when said body temperature is raised through desorption intervals characteristic of each constituent gas to a higher temperature, and including means for varying said body temperature through a range including said lower and said higher temperatures as a function of time in correlation with said means to record said current.

15. Apparatus as claimed in claim 14 wherein said body comprises a refractory metal substantially free of micropores in the form of a two-terminal elongate conductor arranged to be heated by a supply of electric current.

16. Apparatus as claimed in claim 14 wherein said body comprises a refractory metal annular disc and said means for raising the body temperature comprises means to induce electric currents in said disc by a time-varying electro-magnetic field.

17. Apparatus as claimed in claim 16 wherein said body comprises a plurality of said discs coaxial with each other and being axially spaced.

References Cited in the file of this patent

UNITED STATES PATENTS

| | | |
|---|---|---|
| 2,307,800 | Norton | Jan. 12, 1943 |
| 2,377,900 | Podbielniak | June 12, 1945 |
| 2,934,941 | Snitzer et al. | May 3, 1960 |
| 2,941,395 | Myer | June 21, 1960 |